(12) United States Patent
Reid et al.

(10) Patent No.: US 9,858,169 B2
(45) Date of Patent: Jan. 2, 2018

(54) MONITORING A DATA PROCESSING APPARATUS AND SUMMARISING THE MONITORING DATA

(75) Inventors: Alastair David Reid, Fulbourn (GB); Katherine Elizabeth Kneebone, Waterbeach (GB); Jan Guffens, Lubbeek (BE); Lee Douglas Smith, Sawston (GB)

(73) Assignee: ARM Limited, Cambridge (GB)

( * ) Notice: Subject to any disclaimer, the term of this patent is extended or adjusted under 35 U.S.C. 154(b) by 1259 days.

(21) Appl. No.: 12/458,287

(22) Filed: Jul. 7, 2009

(65) Prior Publication Data

US 2010/0077143 A1    Mar. 25, 2010

(30) Foreign Application Priority Data

Jul. 9, 2008 (GB) .................................. 0812560.1

(51) Int. Cl.
*G06F 11/34* (2006.01)

(52) U.S. Cl.
CPC ........ *G06F 11/348* (2013.01); *G06F 11/3471* (2013.01); *G06F 2201/86* (2013.01); *G06F 2201/88* (2013.01)

(58) Field of Classification Search
CPC ............... G06F 11/348; G06F 2201/86; G06F 2201/88; G06F 11/3471
USPC ........................................................ 711/154
See application file for complete search history.

(56) References Cited

U.S. PATENT DOCUMENTS

| | | | |
|---|---|---|---|
| 5,051,944 A | 9/1991 | Fetterolf et al. | |
| 5,274,811 A | 12/1993 | Borg et al. | |
| 6,021,261 A | 2/2000 | Barrett, Jr. et al. | |
| 6,530,031 B1 * | 3/2003 | Randall et al. | 713/502 |
| 6,574,721 B1 * | 6/2003 | Christenson et al. | 711/209 |

(Continued)

FOREIGN PATENT DOCUMENTS

| | | |
|---|---|---|
| CN | 101059772 | 10/2007 |
| EP | 1 100 017 | 5/2001 |

(Continued)

OTHER PUBLICATIONS

Webopedia, "Multi-Core Technology", Feb. 22, 2008, pp. 1-3, http://web.archive.org/web/20080228000102/http://www.webopedia.com/TERM/M/multi_core_technology.html.*

(Continued)

*Primary Examiner* — Christopher D Birkhimer
(74) *Attorney, Agent, or Firm* — Nixon & Vanderhye P.C.

(57) ABSTRACT

A data processing apparatus is disclosed that comprises monitoring circuitry for monitoring accesses to a plurality of addressable locations within said data processing apparatus that occur between start and end events said monitoring circuitry comprising: an address location store for storing data identifying said plurality of addressable locations to be monitored and a monitoring data store; said monitoring circuitry being responsive to detection of said start event to detect accesses to said plurality of addressable locations and to store monitoring data relating to a summary of said detected accesses in said monitoring data store; and said monitoring circuitry being responsive to detection of said end event to stop collecting said monitoring data; said monitoring circuit being responsive to detection of a flush event to output said stored monitoring data and to flush said monitoring data store.

24 Claims, 8 Drawing Sheets

(56) References Cited

U.S. PATENT DOCUMENTS

| | | | |
|---|---|---|---|
| 6,581,130 B1* | 6/2003 | Brinkmann et al. | 710/306 |
| 6,697,925 B1* | 2/2004 | Federici et al. | 711/167 |
| 6,728,845 B2* | 4/2004 | Adiletta et al. | 711/154 |
| RE38,514 E * | 5/2004 | James et al. | 711/163 |
| 7,069,397 B2* | 6/2006 | DeRoo et al. | 711/154 |
| 7,143,251 B1* | 11/2006 | Patterson | 711/162 |
| 7,269,708 B2* | 9/2007 | Ware | 711/203 |
| 2002/0174389 A1 | 11/2002 | Sato et al. | |
| 2005/0097085 A1* | 5/2005 | Shen et al. | 707/3 |
| 2006/0294434 A1 | 12/2006 | Ikeda et al. | |
| 2007/0234147 A1 | 10/2007 | Nakamura | |
| 2008/0040634 A1* | 2/2008 | Matsuzaki et al. | 714/47 |
| 2008/0177941 A1* | 7/2008 | Yim et al. | 711/105 |

FOREIGN PATENT DOCUMENTS

| | | |
|---|---|---|
| EP | 1 847 931 | 10/2007 |
| JP | 62-287345 | 12/1987 |
| JP | 3-59731 | 3/1991 |
| JP | 5-216718 | 8/1993 |
| JP | 6-35760 | 2/1994 |
| JP | 2001-134471 | 5/2001 |
| JP | 2001-519949 | 10/2001 |
| JP | 2002-342125 | 11/2002 |
| JP | 2003-132019 | 5/2003 |
| JP | 2006-293560 | 10/2006 |
| JP | 2007-11512 | 1/2007 |
| JP | 2007-213556 | 8/2007 |
| JP | 2007-249884 | 9/2007 |
| JP | 2007-293424 | 11/2007 |
| JP | 2008-41036 | 2/2008 |
| WO | WO 98/45784 | 10/1998 |

OTHER PUBLICATIONS

Gnu, "11.4.4. Address Hashing", Nov. 28, 2006, pp. 1, http://web.archive.org/web/20061128021925/http://www.gnu.org/software/mit-scheme/documentation/mit-scheme-ref/Address-Hashing.html.*

Raj Jain, "A Comparison of Hashing Schemes for Address Lookup in Computer Networks", IEEE Transactions on Communications, vol. 40, No. 10, Oct. 1992, pp. 1570-1573.*

UK Search Report for UK Application No. 0812560.1 dated Nov. 14, 2008.

Savage et al., "Eraser: A Dynamic Data Race Detector for Multithreaded Programs", ACM Transactions on Computer Systems, vol. 15, No. 4, (Nov. 1997), pp. 391-411.

Detlefs et al., "Extended Static Checking", SRC Research Report 159, Compaq Systems Research Center, (Dec. 18, 1998), 49 pages.

UK Search Report dated May 19, 2010 for GB 0911893.6.

UK Search Report dated Nov. 5, 2009 for GB 0911893.6.

Chinese First Office Action dated Apr. 12, 2013 in CN 200910140225.6 and English translation.

Japanese Office Action dated Feb. 26, 2013 in JP 2009-161994 and English translation.

* cited by examiner

MONITORING A DATA PROCESSING APPARATUS AND SUMMARISING THE MONITORING DATA

BACKGROUND OF THE INVENTION

Field of the Invention

The present invention relates to the field of data processing and in particular to the monitoring of data processing systems.

Description of the Prior Art

Data processing apparatus are becoming increasingly complex and thus, it is getting more and more difficult to analyse their performance whether for optimisation or for fault finding without extracting and analysing large amounts of data.

Furthermore, data processing apparatus increasingly have multiple processors. These multiple processors often access the same data storage and thus, a problem of race conditions arises where one processor is writing to a stored variable at roughly the same time that another processor is accessing it. Such a problem occurs due to insufficient synchronisation between the processors.

A different but related problem arises when tuning the performance of multiprocessor systems. A programmer needs to understand the performance implications of having two pieces of code running at the same time on different processors due to for example bus contention.

Furthermore, it may be important to be able to check that functions only access a certain portion of memory within their permitted range and do not access memory outside of this range.

One known way to check for race conditions is by dynamic race detection mechanisms. For example the Eraser system described in "Eraser: a dynamic data race detector for multithreaded programs", ACM transactions on computer Systems (TOCS) vol 15, issue 4, November 1997 pages 391-411 1997 Savage et al. The Eraser system modifies the program it is monitoring to monitor every shared memory reference and to verify that consistent locking behaviour is observed. Runtime modification such as this has two problems associated with it. Firstly it can cause a substantial slowdown (Eraser typically slows a system by 10 to 30 times), thus it cannot be applied in real time systems, and secondly it modifies the software and thus, cannot be used to detect problems caused by interactions with accelerators which are either not programmable (e.g. a DMA controller), or do not have a rich enough instruction set to express the monitoring code or where the code cannot be modified for either practical or legal reasons.

Another way to check for race conditions is by static race detection mechanisms, for example the "Extended Static Checking" (ESC) which is described in HP Labs Tech reports SRC-RR-159 by Detlefs et al. http://www.hpl.hp-.com/techreports/compaq-DEC/SRC-RR-159.HTML and in Engels et al.'s MC system described in "Checking System Rules Using System-Specific, Programmer-Written Compiler Extensions" in Proceedings of the $4^{th}$ Symposium on Operating system Design and Implementation.

Both of these static approaches work by performing a static analysis of the program which aims to detect most race conditions in the program but not to prove that they are not present. MC works by checking that the programmer follows established (manually verified) idioms when acquiring and releasing locks whiles ESC performs a deeper reasoning about programs which can also detect problems such as writing beyond the bounds of an array. Static analysis avoids the overhead associated with dynamic detection but is unable to find some race conditions that dynamic detection can catch. In additions, static analysis tools generally only support a limited set of locking conventions and are unable to check (or report many false positives) when a different locking convention is used.

There are many tools available for profiling a processing system to provide an indication of its performance. For example, many operating systems have tools which produce graphs showing how busy each CPU is, how much memory is in use and how the numbers are varying in time.

These profiling tools can rely on performance counters provided by the system hardware. For example, most modern processors can count events like number of instructions executed or number of cache misses. These counters are typically used in two modes. In one mode (we will call this "one-shot mode"), the programmer (or a tool) modifies the program to turn the counter on at the start of a task and to read the value of the counter at the end of the task. This value is presented to the user or is stored to present to the user at a later point. In the other mode (which we call "periodic sampling"), a periodic interrupt triggers a library to read the performance counter and stream values out to storage for later examination. They may, for example, be displayed as a graph.

In both cases, the processor is required to read the current counter value. This requirement makes the process invasive (the act of measuring may disrupt the results). It also imposes an overhead on the processor responsible for reading the performance counter which, ultimately, limits the granularity and possibly the precision at which measurements can be made.

Compared with one-shot mode, using performance counters in "periodic sampling" mode has the disadvantage that the task one wishes to monitor may start halfway through a sampling period and end halfway through another sampling period resulting in imprecise performance figures. This imprecision can be reduced by reducing the sampling period but, this both increases the degree of invasiveness and as long as there is some imprecision, one cannot say for sure that an event definitely happened during some task or did not happen during that task.

A variation on periodic sampling of performance counters is random sampling. This solves some problems that occur when the sampling period is an exact multiple of the frequency of the events one is measuring but does not reduce the imprecision.

The problems of precision and invasiveness can be tackled by providing hardware to trace all events of interest. An off-chip tool can summarise this trace to produce a very detailed, accurate, graph. The disadvantage of such an approach is that if the events occur at high frequency, a large amount of bandwidth is required to produce the trace, a large amount of storage is required to store it and a large amount of processing to summarise it. This is useful if one wants to examine the events individually but is overkill for performance profiling or for detecting race conditions.

It would be desirable to be able to analyse a complex system during realtime without the need to collect and therefore output and process a very large amount of data.

SUMMARY OF THE INVENTION

Viewed from a first aspect, the present invention provides a data processing apparatus comprising monitoring circuitry for monitoring accesses to a plurality of addressable locations within said data processing apparatus that occur between start and end events said monitoring circuitry comprising: an address location store for storing data identifying said plurality of addressable locations to be monitored and a monitoring data store; said monitoring circuitry being responsive to detection of said start event to detect accesses to said plurality of addressable locations and to store monitoring data relating to a summary of said detected accesses in said monitoring data store; and said monitoring circuitry being responsive to detection of said end event to stop collecting said monitoring data; said monitoring circuit being responsive to detection of a flush event to output said stored monitoring data and to flush said monitoring data store.

The present invention recognises that when tracing the activity of a data processing system using a conventional trace method a trace stream is generated including data representing the step-by-step activity within the system and this data is output so that an off chip tool can summarise it. However, a disadvantage of this is that the activities can occur at high frequency requiring large amounts of bandwidth to produce the trace, a large amount of storage to store it and a large amount of processing to summarise it. With increasingly complex systems this problem is getting worse. The present invention addresses this problem by limiting the accesses monitored in time using start and end events as the limits and further limiting it spatially to particular address locations. Furthermore, the system then only collects and outputs a summary of the detected accesses and then clears the monitoring data store.

In this way, sets of monitoring data can be generated that relate to accesses that occurred between particular events and to particular address ranges. Thus, the monitoring data generated can be targeted both temporally and spatially. Furthermore, by only outputting a summary of the accesses occurring the bandwidth of the amount of data output can be considerably reduced. Appropriate selection of the type of summary can help ensure that the reduced data that is output is useful data.

In some embodiments said start event, said end event and said flush event are a same event, such that in response to said same event said monitoring circuitry stops monitoring, outputs said monitoring data, flushes said monitoring data store and starts detecting accesses to said plurality of addressable locations again.

If a same event triggers the start, end and flush of the data then in effect continuous monitoring of the system is achieved with data being output at each event. Thus, the monitoring data is segmented and a summary of access data for different time segments is collected. These can be combined together if information between two more widely spaced events is required.

In other embodiments the start, end and flush events may be different events or alternatively it may be that the start event is also the flush event and so triggers the flush or the end event is also the flush event and triggers both the output of the data and the flushing of the data store.

In some embodiments said start, end and flush events each comprise one of a start of a task, an end of a task, a memory barrier instruction, a predetermined time elapsing, a counter overflowing, a counter reaching a threshold value, writing to a control register, accessing addresses within a particular region, an interrupt and a breakpoint occurring, a send event instruction, a wait for event instruction, a load exclusive instruction (as found in, for example, ARM processors), a store exclusive instruction (as found in, for example, ARM processors), an atomic memory operation (such as an atomic compare and swap instruction), a memory barrier indication on a bus, a load exclusive indication on a bus, a store exclusive indication on a bus, an atomic memory access indication on a bus and a timer.

The different events that can trigger the output of data and the flushing of the data store and the recommencing of detection can be a number of things. In effect any events that it would be helpful to monitor accesses between can be used. Examples are the start and end of a task if it is desirable to monitor accesses occurring within that task, memory barrier instructions which are instructions that are used to ensure that all pending accesses to a memory are executed at that point. Alternatively the events could be a predetermined time elapsing or a counter overflowing or reaching a threshold value. The latter two are particularly useful if a counter is used in the monitoring circuit as this avoids data stored in that counter being lost. Alternatively, the events may include the writing to a control register. This example allows the triggering to be under control of a user in that various events in the processor can be selected by the user to trigger the writing of a value to the control register. In another embodiment the events may be the accessing of particular addresses within a particular region, this particular region might be where locks for the memory region are stored and thus, an access there indicates that a memory range is to be locked or unlocked, or it may be a region from which a device is started in which case an access there indicates that a device is to be started. Alternatively, the event could be an interrupt or a breakpoint occurring.

In some embodiments, said monitoring data output further comprises a signal identifying at least one of said start, flush and end event.

It may be that the start event, end event or flush event are triggered by multiple signals. In which case, it may be desirable to send an indication of the signal with the monitoring data as this will provides additional information relevant to the monitoring data allowing it to be more easily analysed.

In some embodiments, said monitoring data further comprises timestamp data indicating a time of each access.

Further data that is useful in monitoring is timestamp data as it is often useful to know what events occurred at what time as then an order of these events can be accurately deduced. If a processor includes time stamp data with its accesses then this data is useful for monitoring and in some embodiments it is stored with the monitoring data.

In some embodiments, said summary of said detected accesses comprises a fingerprint of said accesses computed by a hash function, while in other embodiments, said summary of said detected accesses comprises a count of said accesses.

The detected accesses may be summarised in a number of ways which involves the data being combined such that less data needs to be output and yet the data is still useful. Thus, a hash function could be used to combine the latest access information. A hash of a sequence of values can be chosen such that if the hash of two sequences is the same then there is a very high probability that the sequences are also the same. That is, the hash function can be used to generate a 'signature' for a sequence of values. Computing the hash of a sequence of values is a good illustration of the value of summarizing data on chip: the raw sequence of values is large (requires high bandwidth to trace and large space to store) and is unwieldy to manipulate (the sequence can have variable length and requires many operations to compare) whereas the summary fits in just one or two data words of memory, and can be compared using just a few operations. Alternatively, a count of a number of data accesses might be useful and a counter could be used to count this number and this could be output rather than information about each individual access.

In some embodiments, said monitoring circuitry comprises a counter for counting a number of accesses to said plurality of addressable locations.

If a count of the accesses is required then a counter can be used in the monitoring circuitry for counting the accesses. Such a counter could be a wraparound counter or it could be a saturating counter. A saturating counter has the advantage that it avoids the risk of information that is completely false being output which might occur with a wraparound counter if it overflows between events. In some embodiments the counter could be a one bit saturating counter, this could be used where it was important to detect whether a particular access has occurred or not rather than the number of accesses.

In some embodiments, said plurality of addressable locations comprises at least one of a range of addresses, a plurality of ranges of addresses, a set of particular addresses and an inverse of a range of addresses.

The plurality of addressable locations may be a range of addresses or a plurality of ranges of addresses or it may be a particular set of addresses chosen in a different way. Alternatively, it could be an inverse of a range of addresses such that it is any address outside of a particular range. The latter may be useful if it is desirable to check if a particular entity or process is accessing an address outside of its allowed range.

In some embodiments, said plurality of addressable locations comprises a plurality of ranges of addresses, and said summary of said detected accesses comprises an indication of which of said plurality of address ranges said accesses were to.

The plurality of ranges of addresses to which accesses are made may be monitored individually such that information relating to accesses to each range is stored separately or accesses to several ranges may be collected together if that is the information that is required.

In some embodiments, said summary of said detected accesses further comprises at least one of data indicating a type of access, identifiers identifying entities making said accesses, data indicating a number of each type of said access by at least one of said entity and an indication of which of a plurality of address ranges said accesses were to.

In addition to a number of accesses the summary may also comprise the type of the access, and an identifier identifying the entity making the access. The entity may be a number of things such as a master of some kind, for example a processor, or an accelerator. The summary may also include information on the type of access for example whether it is a read or a write. The count of accesses may be a count of a total number of accesses or it may be that different types of accesses from different entities are counted separately. When analysing a processing apparatus for either performance or error detection reasons it is clear that information on the number and type of accesses occurring between two events to a particular address or range of addresses by each entity is useful information, thus, summarising the information in this way reduces the data output while retaining much of its value.

In some embodiments, said monitoring circuitry comprises a plurality of counters, each counter relating to at least one of: one or more of said entities, one or more of said plurality of address ranges and a type of data access.

One way to record data on which entities performed accesses is to have a counter related to each entity and to increment it each time that entity makes a particular access. It could be that there is a counter for each entity or it could be that it is desirable to count accesses made by two entities, or several entities together or it could be that there are several counters for each entity each counting a different type of access. Counters can also be used for different address ranges.

In some embodiments, said monitoring circuitry is coupled to a bus port within said data processing apparatus, said entities comprising a plurality of bus masters.

Although the data processing apparatus can be arranged in a number of ways, it may be desirable for the monitoring circuitry to be coupled to a bus port, this may be a bus master port or a bus slave port, the monitoring circuitry can then determine which entity sent which access by looking at the signals on the bus master port which will indicate the master from which they were sent.

Although the monitoring data store may be formed in a number of ways in some embodiments said monitoring data store comprises a cache.

In some embodiments said summary of said detected accesses further comprises data indicating at least one of a type of access, identifiers identifying entities making said accesses, and data indicating a number of each type of said access by at least one of said entity, and an indication of which of a plurality of address ranges said accesses were to, said cache being configured to store a plurality of sets of monitoring data each set relating to at least one of one or more of said entities, a type of data access and one or more of said plurality of address ranges.

A cache can efficiently store a plurality of sets of monitoring data thereby avoiding the need for many individual data stores such as individual counters. This can be an efficient way of storing the information.

In some embodiments, said monitoring circuitry comprises logic for flushing one of said plurality of sets of monitoring data in response to detection of said cache being full and to a detected access.

One advantage of using a cache to store the information is that it may be that many of the accesses that are to be detected do not occur. In such a case no storage space is used in the cache, the cache only storing counts of accesses that have occurred. If an access does occur and there is no more space to store it, then in some embodiments earlier data that has been collected relating to different accesses is output and then that storage space can be used to store the newly detected accesses.

In some embodiments, said data processing apparatus comprises a plurality of processing elements and a plurality of monitoring circuitry.

The monitoring circuitry used here can be used to monitor complex data processing apparatus with several processing elements such as processors, bus masters and DMA controllers. To do this a single monitoring circuitry may be used with connections to detect accesses by the plurality of processors or a plurality of monitoring circuitries may be used, each monitoring one or several processors. These plurality of circuits may be triggered by different start and end events or they may be triggered by the same events.

In some embodiments said data processing apparatus further comprises an event configuration store, said data processing apparatus being adapted to write to said event configuration store in response to a predetermined instruction, said monitoring circuitry being responsive to a value stored in said event configuration store to either start monitoring said plurality of addressable locations, output said monitoring data or flush said monitoring data.

The monitoring circuitry may be responsive to a value stored in an event configuration store to start monitoring, stop monitoring, output and flush the monitoring data. In such a case, the data processing apparatus writes to the event configuration store in response to particular instructions and thus, the starting and stopping of the monitoring can be controlled by instructions inserted into the code and processed by the data processing apparatus.

In some embodiments, the data processing apparatus comprises a data input for receiving data for updating said address location store for storing data identifying said plurality of addressable locations.

The address location store for storing data identifying the plurality of addressable locations can be updated so that the apparatus is configurable to monitor different addresses. This may be done in response to a signal at a data input that is input by a user perhaps via a debugger. Alternatively, it may be updated by a signal from the processor.

In some embodiments, said data processing apparatus further comprises an output from said data processing apparatus for outputting said monitoring data in response to said flush event, said flush event comprising an internal event generated by said data processing apparatus.

The monitoring data may be output directly from the data processing apparatus in response to the flush event by for example streaming the monitoring data out of a trace port. The flush event is an internal event generated by the data processing apparatus so that in effect the apparatus spontaneously outputs the monitoring data rather than reacting to an external request for the monitoring data. Alternatively, in other embodiments the monitoring data might be stored in a memory on the data processing apparatus to be accessed and analysed later.

According to a second aspect of the present invention there is provided a method of monitoring a data processing apparatus comprising performing the following steps a plurality of times: detecting a start event; detecting accesses to a plurality of addressable locations and storing monitoring data relating to a summary of said detected accesses in said monitoring data store; detecting an end event; outputting said stored monitoring data; and clearing said monitoring data store.

According to a third aspect of the present invention there is provided a method for analysing monitoring data generated by a data processing apparatus according to a first aspect of the present invention comprising the steps of:

receiving a plurality of sets of monitoring data relating to a summary of accesses made to a plurality of address locations generated between a plurality of start and end events;

combining monitoring data from different sets of monitoring data to generate new sets of monitoring data relating to more widely spaced start and end events; and analysing said monitoring data in conjunction with data identifying said start and end events and said plurality of address locations.

The monitoring data output by the data processing apparatus of the first aspect of the present invention needs to be analysed. This monitoring data is generated as a plurality of sets of monitoring data, each set relating to accesses that occurred between particular events. When analysing the data some of these sets are combined to generate new sets of monitoring data relating to more widely spaced start and end events. Combining this monitoring data in this way enables it to be analysed as is desirable such that accesses occurring both between events that directly triggered the collection of a monitoring set and other events that started and ended different monitoring sets can be used as monitoring information.

In some embodiments, said monitoring data further comprises an indication of which entity performed said accesses; said step of analysing comprising determining if an entity accesses an address outside of an allowed range for said entity.

By selection of the appropriate address ranges to be monitored and differentiating between the entities making the accesses the monitoring data can be used to determine whether or not a particular entity performed an access to an address range outside of an allowed range. This is useful information and indicates where there might be a fault in the system.

Alternatively in other embodiments, said monitoring data further comprises an indication of which entity performed said accesses; said step of analysing comprising determining if different entities performed a write and a read to a same address range within one of said sets of monitoring data.

Analysing the accesses of different reads and writes to the same address range from different entities between two events can also indicate where there may be a race condition. For example, if said same event is triggered when an entity starts a task or when an entity ends a task, and said same address range corresponds to a variable which should be accessed exclusively by one task at a time, then it is an error if one entity performs a non-zero number of writes to the address range and the other entity performs a non-zero number of reads or writes to the address range. It should be noted that task is a synonym for process in this application Alternatively, in other embodiments the monitoring data can be used as an indication of a performance of a system. In such an embodiment, said step of analysing comprises determining a performance of said data processing apparatus between different events, by dividing a number of accesses by a time between said events.

A fourth aspect of the present invention provides a computer program product which is operable when run on a data processor to control the data processor to perform the steps of the method according to a third aspect of the present invention.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
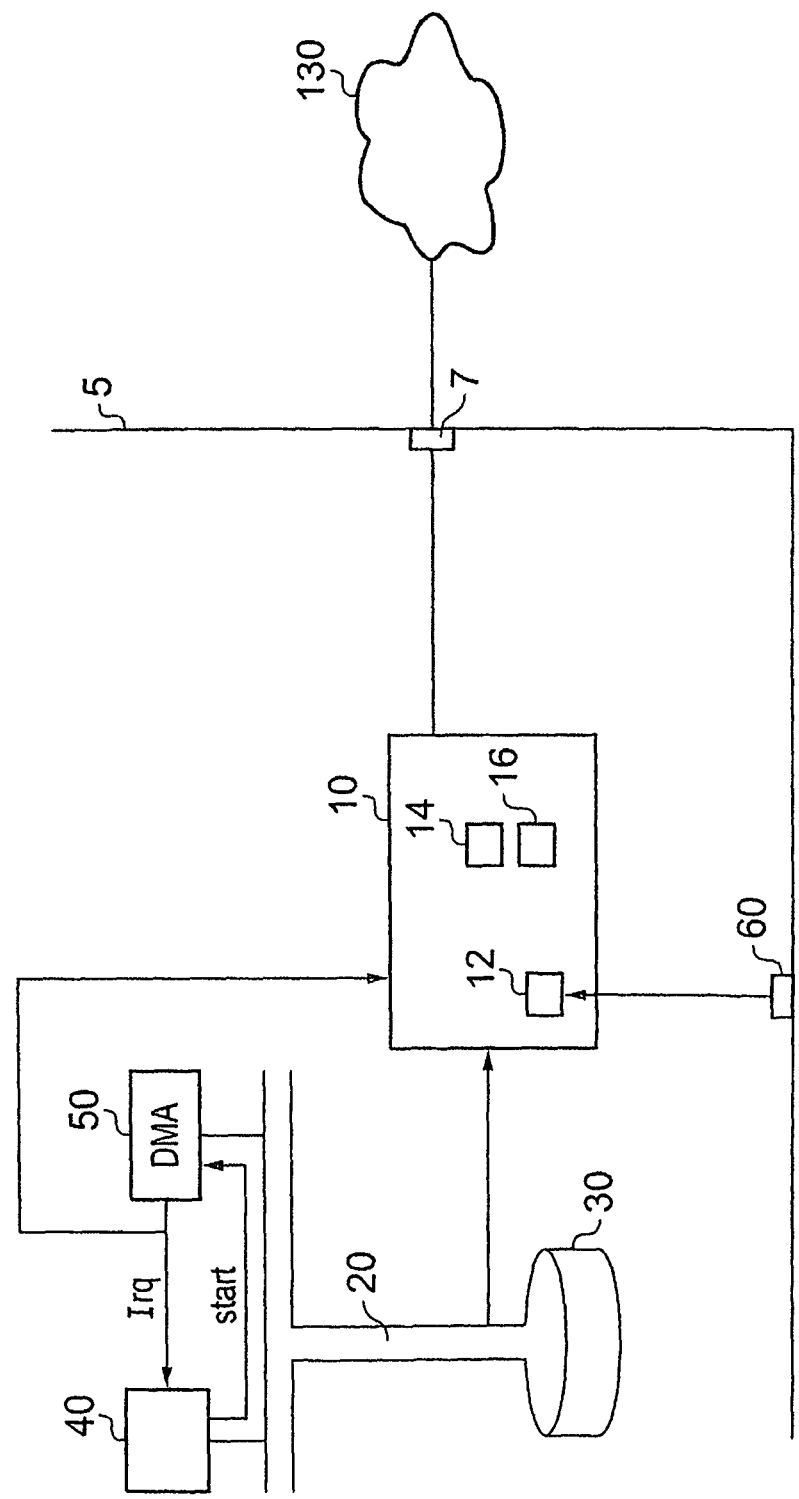
FIG. 1 shows a data processing apparatus with monitoring circuitry according to an embodiment of the present invention.

FIG. 1 shows a data processing apparatus 5 comprising monitoring circuitry 10 for monitoring a bus 20 that connects memory 30 with processor 40 and DMA 50.

Data access requests from the processor 40 and DMA 50 to read data from and write data to memory 30 pass along bus 20 and are monitored by monitoring circuitry 10.

In this embodiment monitoring circuitry 10 is configured to monitor accesses to a particular address range, the particular address range being identified by information stored in data store 12. Data store 12 is updated by a user using a debugger via input 60, and thus, the monitoring circuitry can be reconfigured to monitor different address ranges.

Monitoring circuitry 10 is responsive to a particular "start" event to commence collecting monitoring data from the bus. In this embodiment the monitoring data collected is detected access requests to addresses within the specified address range. These trigger an "increment counter" signal within the monitoring circuitry 10 and this is sent to one of the counters 14, 16 within the circuitry. In the case of a read being detected the signal is sent to read counter 14 whereas detection of a write triggers a signal to be sent to write counter 16. Thus, counter 14 counts detected reads and counter 16 counts detected writes. In this embodiment for the sake of simplicity only two counters are shown but it would be clear to the skilled person that there could be more counters, each perhaps relating to different address ranges and/or entities requesting the accesses, such that reads and writes in different address ranges from different entities could be counted.

In this embodiment a further event triggers the monitoring circuitry to output its monitoring data, which in this case is the values in the counters 14 and 16. The monitoring data is output via output 7 to analysing logic 130, where the data is analysed. Following this the counters are cleared and counting recommences when the particular "start" event is detected again.

The events that trigger starting of the monitoring and the output of the values and flushing of the counters can be a number of things but in this embodiment it is detection of either DMA starting or ending a memory transfer or a memory barrier instruction being executed by the processor. Memory barrier instructions are instructions that are used to ensure that any pending memory accesses are executed before a subsequent instruction is executed. Thus, in response to a memory barrier instruction any pending reads or writes to the specified memory will be performed. These instructions can therefore be useful when used to trigger the output of monitoring data as it is clear that at this point all pending read or writes will have been executed. Thus, processor 40 instructs DMA 50 to start a memory transfer and the start instruction travels along the bus and is detected by monitoring circuitry 10. When the memory transfer is complete, DMA 50 may indicate this to processor 40 by means of an interrupt. This is not sent along the bus and thus, needs a separate channel to route it to the monitoring circuitry 10 as it is this signal which is the end event for the monitoring circuitry. It should be noted that in this embodiment the start signal from the processor to the DMA acts as the start event, however, in some embodiments the DMA may not start the memory transfers immediately in response to a start memory transfer request from processor 40. In such a case, the DMA may have a further line to the monitoring circuitry 10 along which a signal can be sent when it does indeed start performing the requested memory transfer, alternatively the monitoring circuitry may detect the memory access requests on the bus and this detection could act as the start event.

In this embodiment counters 12 and 14 are saturating counters. In other embodiments wraparound counters may be used provided that they are large enough so that it is unlikely that they will wrap around. In other embodiments one-bit saturating counter could be used if it is desirable simply to detect whether a particular access has occurred rather than to detect the number of those accesses.

Although in this embodiment the address location identifier stored in data store 12 identifies a range of addresses, in other embodiments it might identify a plurality of ranges. Alternatively it could be used with a comparator that is triggered by an address not matching rather than matching to identify any address outside of a particular range. This might be useful if there was a known allowed range for a process and it was desirable to check that it did not access locations outside of this. Thus, it can be seen that this system can be designed in a number of different ways to monitor different specified things, yet it does not require a high bandwidth to output this data which has been summarised.

Figure 2A:
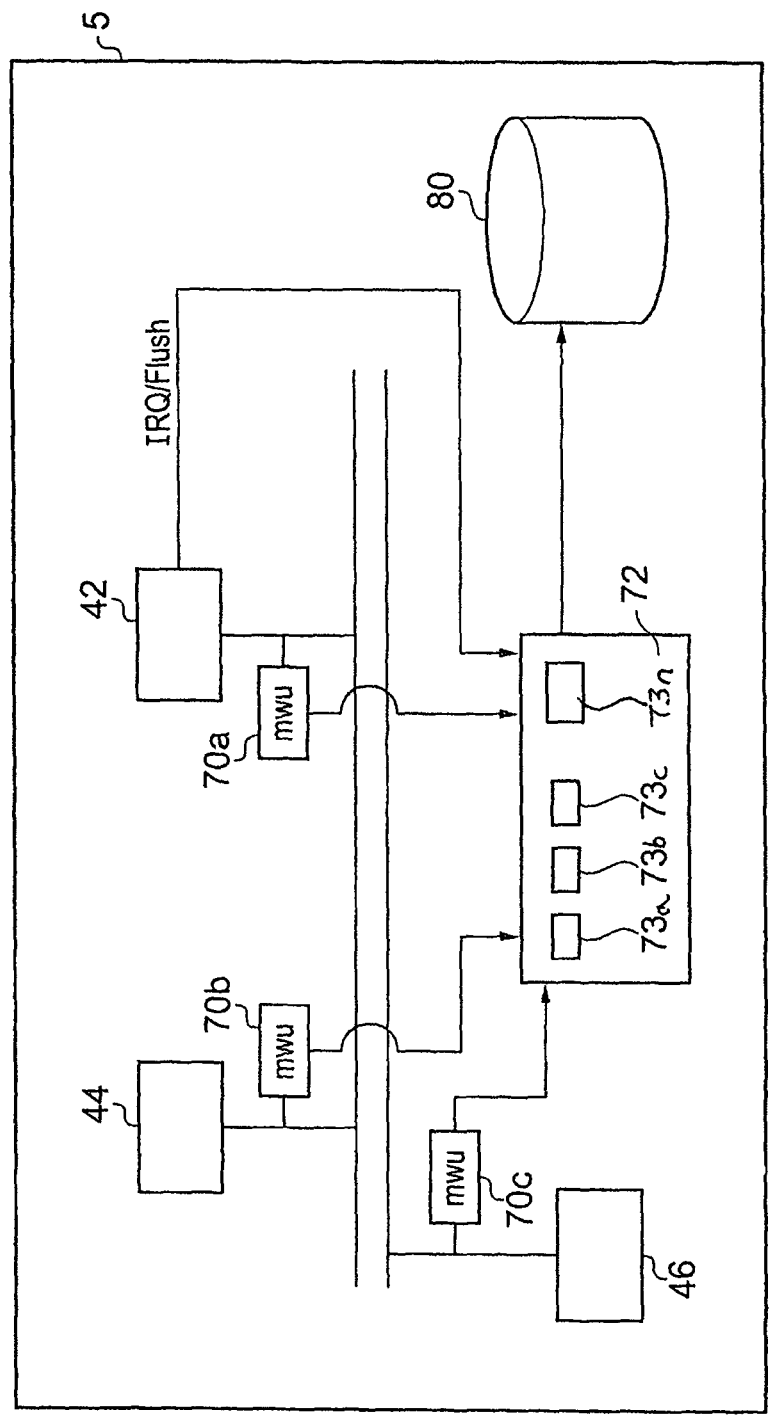
FIG. 2a shows a data processing apparatus with memory watch units and a monitoring summarising unit according to an embodiment of the present invention.

FIG. 2a shows a data processing apparatus 5 according to an alternative embodiment. In this embodiment there are several monitoring circuits or memory watch units 70a, b and c. Memory watch unit 70a monitors accesses made by processor 42 while memory watch unit 70b monitors accesses made by processor 44. Memory watch unit 70c monitors accesses made to data store 46. These individual memory watch units monitor the accesses in particular address ranges that are specified and they send signals to a central summarising unit 72 identifying the accesses that they have detected. Summarising unit 72 has a plurality of data stores 73a. 73b, 73c-73n for storing information from the different memory watch units. These may comprise counters that count the number of a particular type of access from a particular memory watch unit or they may comprise data stores for storing timestamp information that is received with the access signal indicating a time when that access occurred or they may comprise hash function generators for generating and storing a hash function of the accesses that are detected. Additionally they may record the number of stalls due to contention if such events are monitored by any of the memory watch units. Summarising unit 72 also comprises an input for receiving a flush signal. In this embodiment this flush signal is generated in response to an interrupt and it acts as both a "start" an "end" and a "flush" event causing the data stored in the different counters and data stores to be output to memory 80, to be flushed or cleared and information to be collected again from the different memory watch units 70a, 70b, 70c. Thus, in effect the interrupt ends a particular set of monitoring, outputs the data, flushes the data stores and thereby starts the new set of monitoring. As the interrupt does not travel along the bus, the interrupt needs to be sent separately to the summarising unit 72 from processor 42.

An example hash function generator which could be used might use a Cyclic Redundancy Check (CRC) function and the summary of a sequence would consist of the CRC of the sequence of data and the length of the sequence. Two cases are particularly interesting:

a) The address sequence accessed by a task is often the same each time that task executes so a hash of the address sequence of a task execution can be used as a signature of the function either to i) identify the task by comparing it against the hashes of the address accesses of all tasks in the system or to ii) recognise that a task is behaving differently from normal by comparing the hash of the address sequence against hashes of the address sequence of previous executions of the task: if the signatures are different, the task is behaving differently.

b) If one task writes a sequence of values to memory in the same order that another task reads that sequence of values from memory then a hash of the output of the first task will match a hash of the input to the second task. If we know the flow of data between tasks and that tasks write/read one of their variables in a particular order, then this property can be used to check that data is being transferred correctly from one task to another by comparing the signatures of data that should match (and has not, for example, been corrupted during data transfer). If a task simply copies data from one region of memory to another, then the signature of the data read should be the same as the data rewritten so we can confirm that the memory copy performed correctly by comparing the input and output signatures of the task.

If we do not know the flow of data between tasks, then this property can be used to reconstruct part of the flow of data in the system by looking for situations where the output of one task always has the same signature as the input to a later task.

In this embodiment rather than outputting the monitoring data externally to the data processing apparatus 5 it is sent to a memory 80 within the data processing apparatus where it is stored. It can then be accessed later for analysis.

Figure 2B:
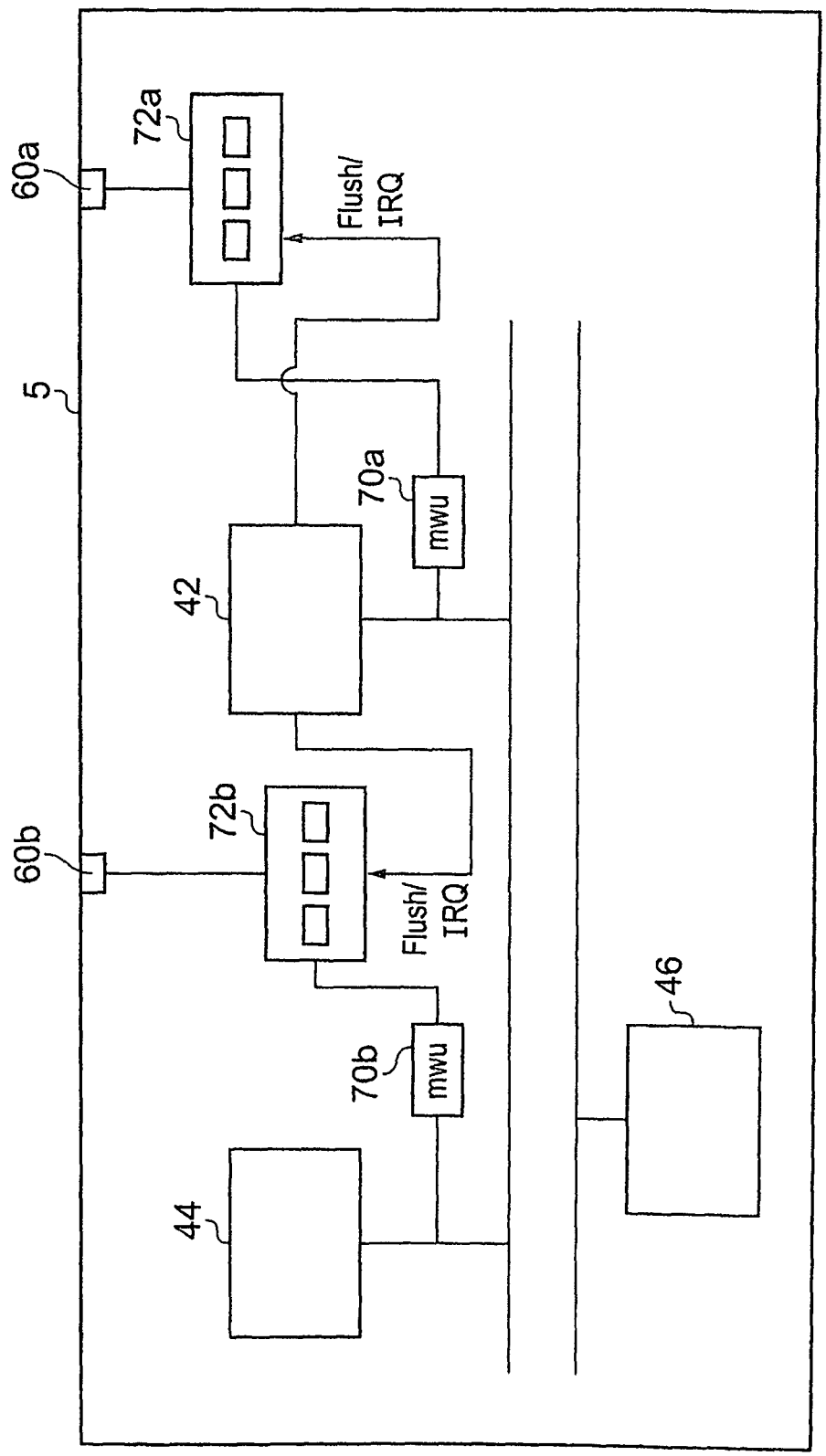
FIG. 2b shows a data processing apparatus with memory watch units and corresponding monitoring summarising unit according to an embodiment of the present invention.

FIG. 2b shows a similar embodiment to FIG. 2a but in this embodiment each memory watch unit, 70a and 70b has its own summarising unit 72a and 72b. These summarising units start and stop collecting data, output this collected data and clear their counters in response to the same signals. The data is output in this embodiment to output ports 60a and 60b. The data output can be analysed separately, alternatively the two streams of output data can be merged into a single stream using software by correlating their corresponding start/stop/flush events.

It should be noted that although the memory watch units in these embodiments monitor the accesses in particular address ranges that are specified, they may also be used to trigger an exception in response to detecting a particular access and could thus, be used to implement watchpoints or memory protection units.

Figure 3:
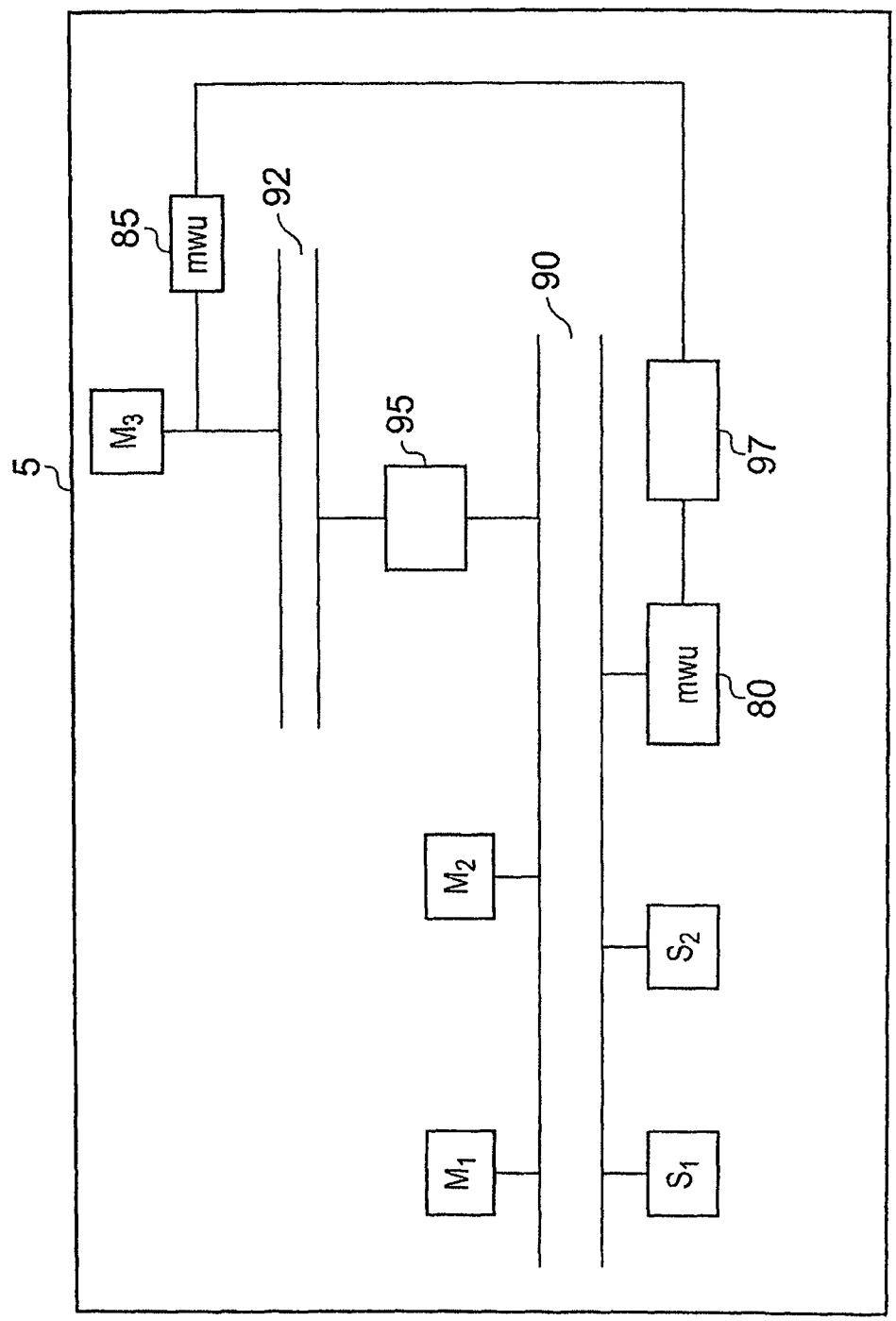
FIG. 3 shows a data processing apparatus according to a further embodiment of the present invention.

FIG. 3 shows an alternative embodiment of the invention. In this embodiment data processing apparatus 5 has a memory watch unit 80 that watches the main bus 90 and monitors accesses made by master M1 and M2 to slaves S1 and S2. Accesses are also made by other masters on a different bus 92 and these may be sent via bus bridge 95 to main bus 90 if it is required to access devices on this bus. Bridge 95 transmits the access information but removes information relating to which master generated the signal and thus, in order to identify which accesses came from which master on bus 92 a further memory watch unit 85 is used which in this embodiment monitors the bus master port of master M3.

In this embodiment each memory watch unit 80, 85 collects data relating to accesses to particular address ranges specified within them and acts in response to the same "end" events to output this data. In this case the memory watch units 80, 85 are responsive to particular values in control register 97 set by data processing apparatus 5, these values indicate to the memory watch units to start monitoring or to end monitoring. The value in this control register 97 is set by a processor in response to instructions that are inserted in the code by a user. Thus, the start and end of monitoring can be controlled by the user.

Although in this embodiment the memory watch units 80 and 85 are shown as separate units that respond to the same events, in some embodiments they can be triggered by different events to start and stop monitoring. In such a case the information they gather will be analysed separately, although it may be combined.

Figure 4:
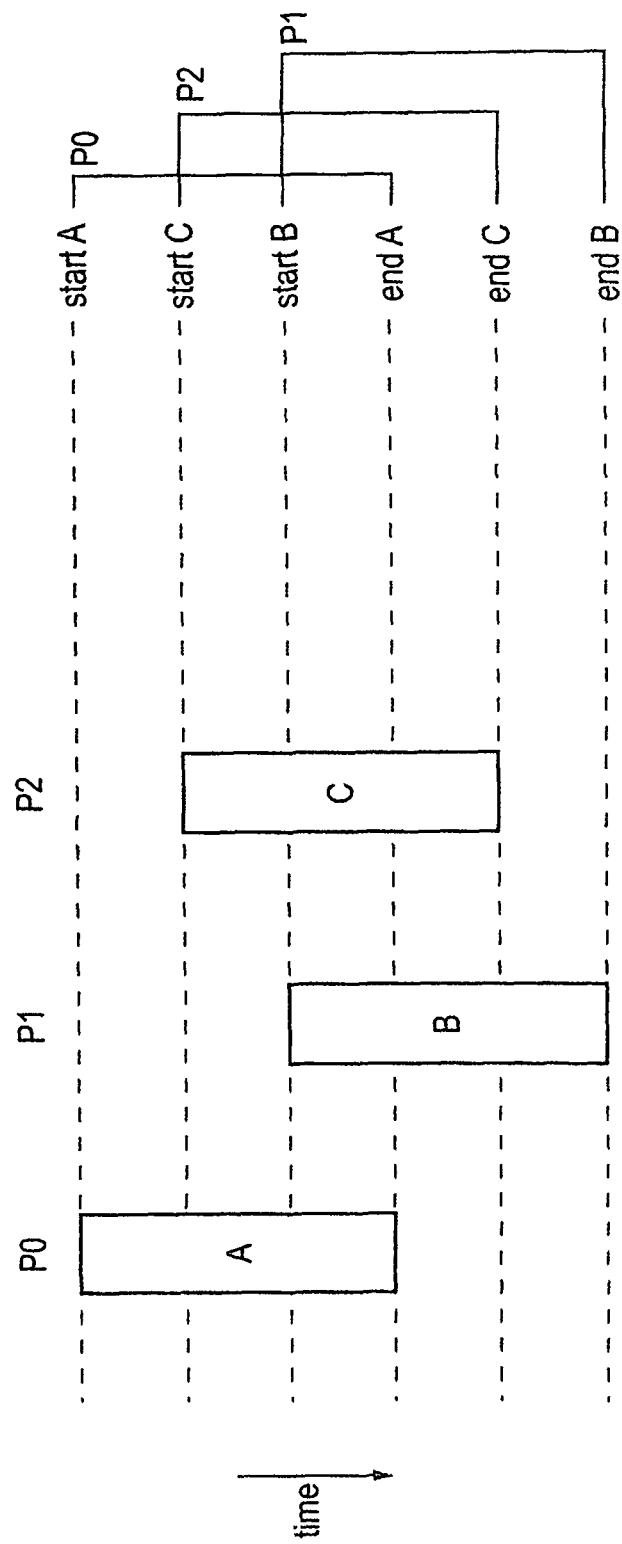
FIG. 4 schematically shows different processes having different start and end events.

FIG. 4 schematically shows how the monitoring of different processes A, B and C which in this embodiment are performed by different processors P0, P1 and P2 can be triggered by different start and stop events. In this case the start and stop events are the start and stop of the particular processes. Thus, different sets of monitoring data are collected for the different processes. This information can be analyzed separately or it can be combined. For example, if the summary is the number of accesses between a start and stop event, then adjacent summaries can be combined by summing the number of accesses in each summary. Likewise, if the summary is a CRC (cyclic redundancy check function) of a sequence of accesses and the number of accesses, then the summaries can be combined as follows:

let <crc1,M> be the first summary
where crc1 is the CRC of the accesses and M is the number of bits the CRC covers
let <crc2,N> be the second summary
where crc2 is the CRC of the accesses and N is the number of bits the CRC covers the combined summary is
<CRC((crc1<<N) xor crc2), M+N>
where 'crc1<<N' is the first crc shifted left N bits
xor computes the exclusive or of its arguments
and CRC computes a CRC on its input data.

Figure 5:
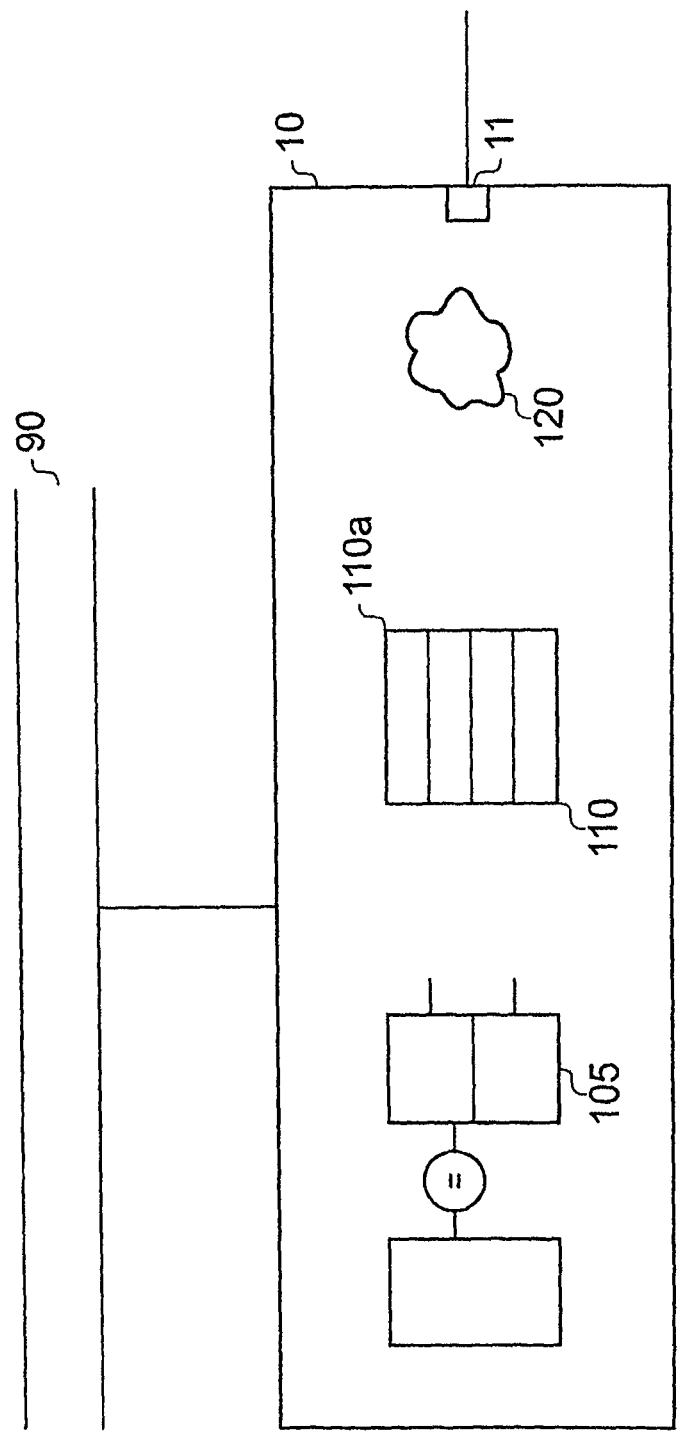
FIG. 5 monitoring circuitry according to an embodiment of the present invention.

FIG. 5 shows monitoring circuitry 10 for monitoring bus 90 in more detail. The monitoring circuitry 10 comprises a comparator 105 for comparing addresses of accesses with the stored selected address ranges. In this embodiment there are two different ranges of addresses stored and the comparator outputs different signals depending on which address range is matched. In response to detecting an address within one of the ranges the entity producing the access is noted along with whether the access is a read or write and a counter 110a within cache 110 corresponding to this type of access, from this type of entity within this address range is incremented. In this embodiment there are a number of different types of accesses that are counted depending on address range, entity and type of access and thus, there are a number of counters in the monitoring circuitry 10. These counters are implemented in this embodiment as a cache of non-zero counters. This is done as many of these counters may be zero for long periods of time and thus, rather than providing many counters a cache of non-zero counters is maintained and when a counter is incremented it is added to this cache. In this embodiment if a new counter is needed but there are no more unused counters available within the cache, one of the counter's value is output and the counter is cleared. The counter to output and clear can be selected in a number of ways, for example a round robin approach may be used. There is also timer which also acts as the end start and flush events, such that if no counter has become full within a specified time then at this moment the data is output through output 11 and the counters are cleared.

In this embodiment comparator 105 detects accesses within specified ranges by finding matches with the addresses. In other embodiments it could be used to detect accesses outside of an address range by detecting no match. This may be useful if it is known that the task should only access addresses within a particular address range or it should not access a particular range where for example locks of memory are stored.

It should be clear to a skilled person that different embodiments combining different elements from each embodiment would be possible. For example, if accesses by several processors or accelerators such as DMA engines are required to be monitored then it may applicable to use several monitoring circuits. These may be placed on the bus master port of each processing element or on bus bridges or on the bus attached to a memory being monitored. They can in effect be positioned anywhere where they can detect the accesses and if required the entity they are sent from and possibly additional information such as timestamp data.

If the aim of the monitoring is to detect race conditions then it will be necessary to distinguish between accesses by any processing elements that might be involved in a race. Thus, in such a case accesses between the different processing elements need to be distinguished between so that an access by two different processing elements to the same address range within a particular time can be identified as a potential race condition. If this is not required then it may not be necessary to distinguish between accesses from different processing elements and a simple count of accesses along a particular bus may be all that is required. Depending on what is needed, different monitoring circuits that count different things can be used.

With regard to the signals that start and end a particular detection set these can be different things depending on what is being monitored. For example a start signal could be sent whenever a task starts on a processing element and an end signal whenever a task completes on that processing element. In this way the accesses made during the processing of the task can be detected. In this case the start and end event signals can be generated from the logical OR of a number of start/stop signals from hard wired accelerators. Alternatively, it might be a breakpoint indicating the start or end of a function call. In some embodiments the nature of the start and/or end event may change depending on circumstances and thus, it is stored along with the monitoring data collected.

It may also be useful to allow processors to explicitly generate start signals by, for example, writing a value to a control register on the hardware such as in FIG. 3. These notifications might be inserted into the code at any inter-processor synchronisation primitives in the RTOS. For example, at context switches within the processor, whenever a lock is taken or released or when a thread blocks waiting for a lock.

With regard to the range of addresses that have been monitored these can be stored within the monitoring circuit and in general there may be multiple ranges of interest and each may have an access summary stored associated with them so that the accesses to the different ranges of address can be identified separately. Alternatively, certain ranges can be combined so that the accesses to this combined range of addresses can be monitored. Alternatively, the addresses of interest may not be within a particular range, they may be a different set of addresses specified in some other way such as for example by a balloon filter.

Figure 6:
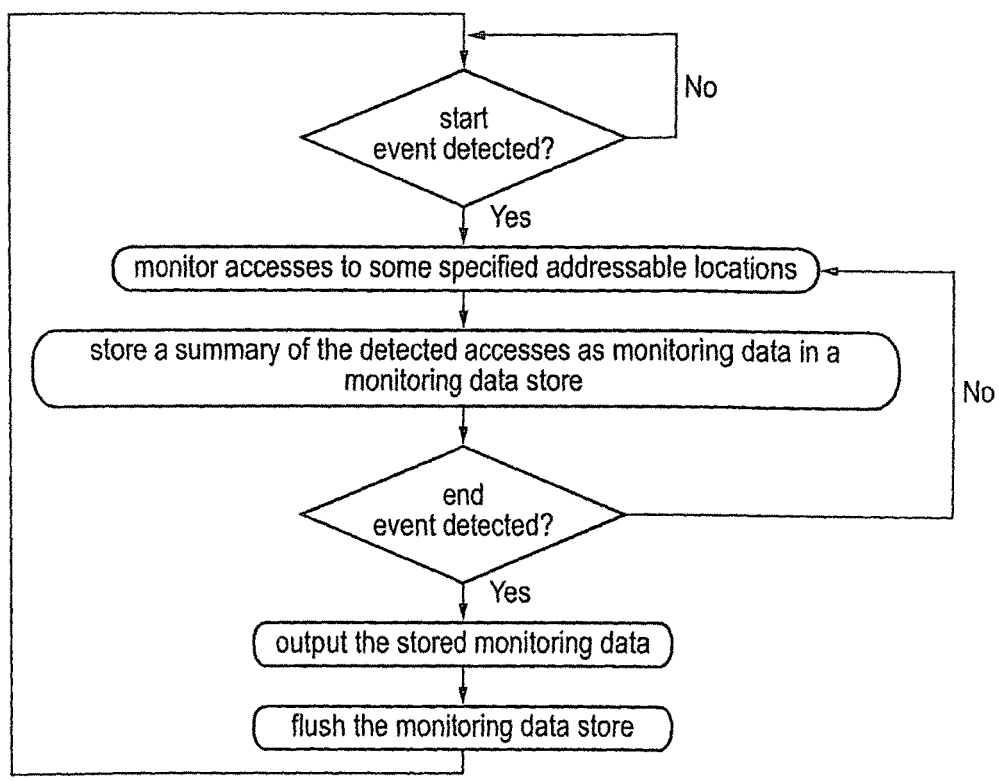
FIG. 6 shows a method of generating the monitoring data according to an embodiment of the present invention.

FIG. 6 shows a flow diagram showing a method of generating the monitoring data according to an embodiment of the present invention. Following detection of a start event accesses to some specified addressable locations are monitored and a summary of the detected accesses is stored in some form, perhaps as a count value in a counter. This continues until an end event is detected whereupon the stored data collected during the monitoring is output and the monitoring data stores are flushed. On detection of a subsequent start event the process begins again.

Figure 7:
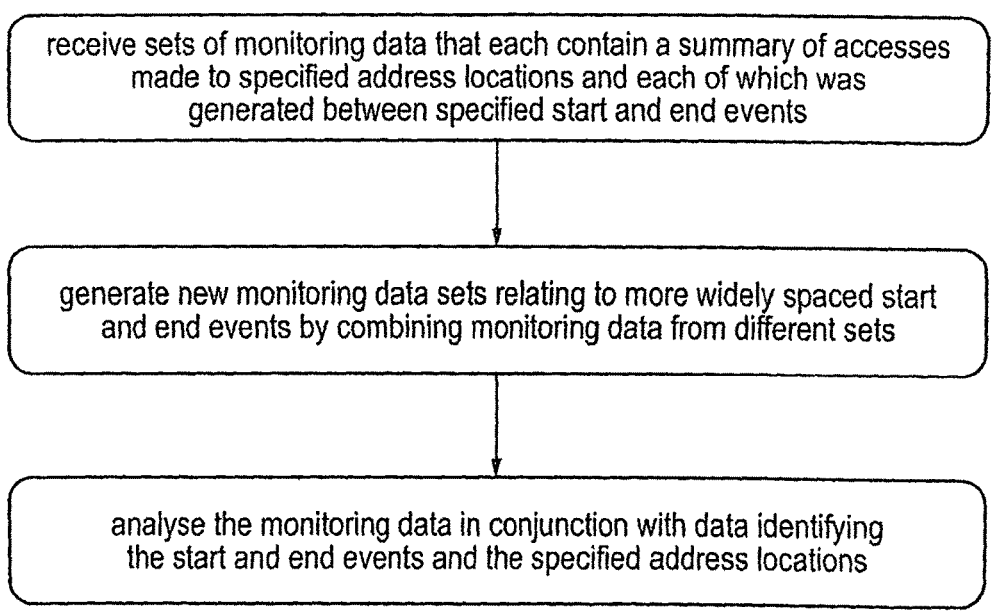
FIG. 7 shows a flow diagram illustrating a method of analysing monitoring data according to the embodiment of the present invention.

FIG. 7 shows a flow diagram illustrating a method of analysing monitoring data according to the embodiment of the present invention. In this method sets of monitoring data generated for example by the method of FIG. 6 are received. Some of these are combined with each other to produce new sets of monitoring data between more widely spaced events. The data is then analysed in conjunction with at least data identifying the start and end events and the specified address locations. Additional data may also have been collected and stored and this may also be used in the analysis. Such data may include timestamp data indicating a time of each access, entity data indicating an entity performing the access, type of access data and nature of start and/or end event.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:
1. A data processing apparatus comprising:
  at least one processing element to issue data access requests specifying an address over a bus to a memory, wherein said data access requests comprise read requests requesting data transfer to said at least one processing element from a location of said memory indicated by said address, or write requests requesting data transfer from said at least one processing element to a location of said memory indicated by said address; and
  monitoring circuitry for monitoring accesses to a selected plurality of addressable locations within memory by said at least one processing element that occur between a start event and an end event, said monitoring circuitry being separate from said at least one processing element and including:
  a reconfigurable address location store for storing data identifying said selected plurality of addressable locations to be monitored and a monitoring data store, wherein the selected plurality of addressable locations are limited to exclude at least one addressable location of said memory from said selected plurality of addressable locations; and
  comparison circuitry to compare addresses of said data access requests issued over the bus by the at least one processing element with said data identifying said selected plurality of addressable locations,
  said monitoring circuitry responsive to detection of said start event to employ said comparison circuitry to detect when data access requests to said selected plurality of addressable locations occur and to store monitoring data relating to a summary of said data access requests to said selected plurality of addressable locations; and
  said monitoring circuitry responsive to detection of said end event to stop collecting said monitoring data and, responsive to detection of a flush event, to output said stored monitoring data and to flush said monitoring data store, wherein said start event, said end event, and said flush event each comprise one of:

(a) a memory barrier instruction included in code executed by the data processing apparatus, (b) writing to a control register, (c) accessing addresses within a particular region, (d) an interrupt, (e) a send event instruction included in code executed by the data processing apparatus, (f) a wait for event instruction included in code executed by the data processing apparatus, (g) a load exclusive instruction included in code executed by the data processing apparatus, (h) a store exclusive-instruction included in code executed by the data processing apparatus, (i) an atomic memory operation, (j) a memory barrier indication on a bus, (k) a load exclusive indication on a bus, (l) a store exclusive indication on a bus, and (m) an atomic memory access indication on a bus,
wherein said flush event comprises an internal event generated by said data processing apparatus.

2. A data processing apparatus according to claim 1, wherein said start event, said end event, and said flush event are a same event, such that in response to said same event said monitoring circuitry is configured to output said monitoring data, flush said monitoring data store, and start detecting accesses to said selected plurality of addressable locations.

3. A data processing apparatus according to claim 1, wherein said monitoring data that is output further comprises a signal identifying at least one of said start, flush, and end event.

4. A data processing apparatus according to claim 1, wherein said monitoring data further comprises timestamp data indicating a time of each data access request.

5. A data processing apparatus according to claim 1, wherein said summary of said detected data access requests comprises a fingerprint of said data access requests computed by a hash function.

6. A data processing apparatus according to claim 1, wherein said summary of said detected data access requests comprises a count of said data access requests.

7. A data processing apparatus according to claim 6, wherein said monitoring circuitry comprises a counter for counting a number of data access requests to said selected plurality of addressable locations.

8. A data processing apparatus according to claim 1, wherein said selected plurality of addressable locations comprises at least one of a range of addresses, a plurality of ranges of addresses, a set of particular addresses, and an inverse of a range of addresses.

9. A data processing apparatus according to claim 1, wherein said selected plurality of addressable locations comprises a plurality of ranges of addresses, and said summary of said detected data access requests comprises an indication of which of said plurality of address ranges said data access requests were to.

10. A data processing apparatus according to claim 1, wherein said summary of said detected data access requests further comprises data indicating at least one of a type of data access request, identifiers identifying entities making said data access requests, data indicating a number of each type of said data access request by at least one of said entity and an indication of which of a plurality of address ranges said data access requests were made to.

11. A data processing apparatus according to claim 10, wherein said monitoring circuitry comprises a plurality of counters, each counter relating to at least one of: one or more of said entities, one or more of said plurality of address ranges, and a type of data access.

12. A data processing apparatus according to claim 10, wherein said monitoring circuitry is coupled to a bus port within said data processing apparatus, said entities comprising a plurality of bus masters.

13. A data processing apparatus according to claim 1, wherein said monitoring data store comprises a cache.

14. A data processing apparatus according to claim 13, wherein said summary of said detected data access requests further comprises data indicating at least one of a type of data access request, identifiers identifying entities making said data access requests, and data indicating a number of each type of said data access requests by at least one of said entity, and an indication of which of a plurality of address ranges said data access requests were made to, said cache being configured to store a plurality of sets of monitoring data each set relating to at least one of one or more of said entities, a type of data access request and one or more of said plurality of address ranges.

15. A data processing apparatus according to claim 14, wherein said monitoring circuitry is configured to flush one of said plurality of sets of monitoring data in response to detection of said cache being full and to a detected data access request.

16. A data processing apparatus according to claim 1, said data processing apparatus comprising a plurality of processing elements and a plurality of monitoring circuitry.

17. A data processing apparatus according to claim 1, said data processing apparatus further comprising an event configuration store, said data processing apparatus being configured to write to said event configuration store in response to a predetermined instructions, said monitoring circuitry being responsive to a value stored in said event configuration store to either start monitoring said selected plurality of addressable locations, output said monitoring data, or flush said monitoring data.

18. A data processing apparatus according to claim 1, comprising a data input for receiving data for updating said address location store for storing data identifying said selected plurality of addressable locations.

19. A data processing apparatus according to claim 1, comprising an output from said data processing apparatus for outputting said monitoring data in response to said flush event.

20. A method of monitoring a data processing apparatus comprising at least one processing element and monitoring circuitry separate from said at least one processing element, said method comprising performing the following steps in sequence by the monitoring circuitry a plurality of times:
detecting a start event;
comparing addresses of data access requests issued by the at least one processing element over a bus to memory with data stored within a reconfigurable address location store and identifying a selected plurality of addressable locations within the memory, wherein said data access requests comprise read requests requesting data transfer to said at least one processing element from a location of said memory indicated by said address, or write requests requesting data transfer from said at least one processing element to a location of said memory indicated by said address, and the selected plurality of addressable locations are limited to exclude at least one addressable location of said memory from said selected plurality of addressable locations;
detecting, in dependence on said comparing step, data access requests to said selected plurality of addressable locations by said at least one processing element and storing monitoring data relating to a summary of said detected data access requests to said selected plurality of addressable locations in a monitoring data store;
detecting an end event;
outputting said stored monitoring data; and
clearing said monitoring data store,
wherein said start event, said end event and said flush event each comprise one of (a) a memory barrier instruction included in code executed by the data processing apparatus, (b) writing to a control register, (c) accessing addresses within a particular region, (d) an interrupt, (e) a send event instruction included in code executed by the data processing apparatus, (f) a wait for event instruction included in code executed by the data processing apparatus, (g) a load exclusive instruction included in code executed by the data processing apparatus, (h) a store exclusive instruction included in code executed by the data processing apparatus, (i) an atomic memory operation, (j) a memory barrier indication on a bus, (k) a load exclusive indication on a bus, (l) a store exclusive indication on a bus, and (m) an atomic memory access indication on a bus,
wherein said flush event comprises an internal event generated by said data processing apparatus.

21. A method according to claim 20 comprising the further steps of:
receiving a plurality of said sets of generated monitoring data relating to a summary of data access requests made to a plurality of address locations generated between a plurality of start and end events;
combining monitoring data from adjoining or overlapping sets of monitoring data to generate new sets of monitoring data relating to more widely spaced start and end events; and
analysing said monitoring data in conjunction with data identifying said start and end events and said plurality of address locations.

22. A method according to claim 21,
wherein said step of detecting accesses comprises detecting an entity making said data access requests and said step of storing said monitoring data further comprises storing an identifier identifying said entity;
wherein said monitoring data further comprises an indication of said entity that performed said data access requests;
said step of analysing comprising determining if an entity accesses an address outside of an allowed range for said entity.

23. A method according to claim 21,
(i) wherein said monitoring data further comprises an indication of which entity performed said data access requests;
(ii) said step of analysing comprising determining if different entities performed a write and a read to a same address range within one of said sets of monitoring data.

24. A method according to claim 21,
(i) wherein said step of analysing comprises determining a performance of said data processing apparatus between different events, by dividing a number of data access requests by a time between said events.

* * * * *